US008579700B2

(12) United States Patent
Davis et al.

(10) Patent No.: US 8,579,700 B2
(45) Date of Patent: Nov. 12, 2013

(54) METHOD AND APPARATUS FOR SETTLEMENT OF PROCESSOR BASED TOURNAMENT COMPETITION

(75) Inventors: Malcolm B. Davis, Dallas, TX (US); Fredrik Dahl, Loerenskog (NO)

(73) Assignee: Malcolm B. Davis, Dallas, TX (US)

( * ) Notice: Subject to any disclaimer, the term of this patent is extended or adjusted under 35 U.S.C. 154(b) by 69 days.

(21) Appl. No.: 13/050,221

(22) Filed: Mar. 17, 2011

(65) Prior Publication Data

US 2011/0230252 A1 Sep. 22, 2011

Related U.S. Application Data

(60) Provisional application No. 61/315,574, filed on Mar. 19, 2010.

(51) Int. Cl.
*G06F 17/00* (2006.01)

(52) U.S. Cl.
USPC .......... 463/22

(58) Field of Classification Search
USPC .......... 463/16–25
See application file for complete search history.

(56) References Cited

U.S. PATENT DOCUMENTS 7,666,092 B2 * 2/2010 Kaminkow et al. .......... 463/25
7,771,270 B2 * 8/2010 Kaminkow et al. .......... 463/22
7,896,734 B2 * 3/2011 Kaminkow et al. .......... 463/16
2004/0176117 A1 * 9/2004 Strittmatter et al. .......... 455/500
2004/0176157 A1 * 9/2004 Walker et al. .......... 463/16
2005/0173862 A1 8/2005 Orenstein
2006/0046823 A1 * 3/2006 Kaminkow et al. .......... 463/16
2007/0021169 A1 1/2007 Gonen et al.
2007/0149292 A1 * 6/2007 Kaminkow et al. .......... 463/46
2008/0020817 A1 * 1/2008 Kaminkow et al. .......... 463/16
2008/0020842 A1 * 1/2008 Kaminkow et al. .......... 463/40
2008/0051168 A1 * 2/2008 Kaminkow et al. .......... 463/16
2008/0070702 A1 * 3/2008 Kaminkow et al. .......... 463/46
2009/0011810 A1 1/2009 Moshal
2009/0029773 A1 1/2009 Cherry
2010/0004056 A1 * 1/2010 Walker et al. .......... 463/25
2012/0100905 A1 * 4/2012 Kaminkow et al. .......... 463/17

OTHER PUBLICATIONS

PCT: International Search Report and Written Opinion of PCT/US2011/028948 (counterpart application); Dec. 15, 2011; 8 pgs.
Patent Cooperation Treaty: International Preliminary Report on Patentability of PCT/US2011/028948; Athina Nickitas-Etienne; Sep. 25, 2012; 4 pages.

* cited by examiner

*Primary Examiner* — Ronald Laneau
(74) *Attorney, Agent, or Firm* — Howison & Arnott, L.L.P.

(57) ABSTRACT

A method of providing or receiving value from or to a participant value in a game tournament wherein a plurality of participants play a casino-style game, includes calculating an expected value for the position of each participant in the tournament, the expected value based upon the number of wagering units held by the participant at the point in time, the number of wagering units held by each other participant in the tournament at the point in time and a payout table for the tournament.

22 Claims, 3 Drawing Sheets

| PLACE | PAYOUT (% OF POT) |
|---|---|
| 1st | 33% |
| 2nd | 20% |
| 3rd | 15% |
| 4th | 11% |
| 5th | 8% |
| 6th | 7% |
| 7th | 6% |

| PLACE | PAYOUT (% OF POT) |
|---|---|
| 1st | 33% |
| 2nd | 20% |
| 3rd | 15% |
| 4th | 11% |
| 5th | 8% |
| 6th | 7% |
| 7th | 6% |

| PLACE | PAYOUT PERCENTAGE % | PROBABILITY OF FINISHING IN PLACE (P) | PRIZE POT (PP) | PAYOUT % * P * PP = EV |
|---|---|---|---|---|
| 1st | 33% | 10% | $100,000 | $3300 |
| 2nd | 20% | 11% | $100,000 | $2200 |
| 3rd | 15% | 12% | $100,000 | $1800 |
| 4th | 11% | 12% | $100,000 | $1320 |
| 5th | 8% | 13% | $100,000 | $1040 |
| 6th | 7% | 15% | $100,000 | $1050 |
| 7th | 6% | 17% | $100,000 | $1020 |
| | | | | $11,730 |

*FIG. 4*

| PLAYER NO. | WAGERING UNITS (CHIP STACK) | PERCENT OF TOTAL UNITS | EXPECTED VALUE | PERCENT OF PRIZE POT | CHIP INDEX |
|---|---|---|---|---|---|
| 1 | 65,975 | 30.04 | 5514.6 | 19.0 | 0.63 |
| 2 | 46,250 | 21.06 | 4664.30 | 16.1 | 0.76 |
| 3 | 23,525 | 10.70 | 3380.51 | 11.6 | 1.09 |
| 4 | 19,050 | 8.67 | 3026.80 | 10.4 | 1.20 |
| 5 | 16,700 | 7.60 | 2842.68 | 9.8 | 1.29 |
| 6 | 16,400 | 7.47 | 2800.00 | 9.6 | 1.29 |
| 7 | 14,450 | 6.68 | 2638.22 | 9.1 | 1.38 |
| 8 | 9,650 | 4.39 | 2192.50 | 7.6 | 1.72 |
| 9 | 7,625 | 3.47 | 1971.37 | 6.8 | 1.96 |

TOTAL PAYOUT - $29,032.00
TOTAL WAGERING UNITS - 219,625

| PAYOUT TABLE | |
|---|---|
| 1 | 8944 |
| 2 | 5545 |
| 3 | 4130 |
| 4 | 3092 |
| 5 | 2333 |
| 6 | 1773 |
| 7 | 1357 |
| 8 | 1046 |
| 9 | 811 |

*FIG. 5*

METHOD AND APPARATUS FOR SETTLEMENT OF PROCESSOR BASED TOURNAMENT COMPETITION

CROSS-REFERENCE TO RELATED APPLICATIONS

This application claims benefit of U.S. Provisional Application for Patent Ser. No. 61/315,574, filed Mar. 19, 2010, and entitled "METHOD AND APPARATUS FOR SETTLEMENT OF PROCESSOR BASED TOURNAMENT COMPETITION," the specification of which is incorporated herein in its entirety for all purposes.

TECHNICAL FIELD

The following disclosure relates to tournament poker and in particular to a system and method for enabling a player to "cash-in" his or her position for a fair value prior to the end of a tournament and for a player to buy into a tournament for a fair value.

BACKGROUND

Tournament poker, played for example over the internet, has become quite popular in recent years. Such tournaments may continue for exorbitantly long hours before completion and the determination of final winners. Consequently, some players may, for one reason or another, wish to leave the tournament before the tournament is completed. However, in many cases, a player that withdraws from a tournament before the tournament is over loses any value associated with his or her chip position.

The ability to cash-in for a small discount to the expected value of a player's chip position at any time in a tournament may have significant appeal to players that may have to leave the tournament for one reason or another or players that simply wish to stop playing and receive a fair value for their chip position. For example, a player may enter a tournament with a "buy in" of for example, one thousand dollars and begin the tournament with a corresponding chip count or position, e.g., one thousand dollars in chips. Assuming that the player is successful, as the tournament progresses and other players are eliminated, the player's chip position may increase to, for example, three thousand dollars. At this point, the player may wish to withdraw from the tournament and receive the fair value of his chip position, less a discount or penalty for withdrawing from the tournament.

SUMMARY

In one embodiment, a method of providing a participant value in a game tournament wherein a plurality of participants play a casino-style game such as poker, includes providing value to the participant based upon a calculated expected value of the participant's position at the time the participant elects to withdraw from the tournament. The expected value of the position of each participant in the tournament is calculated, the expected value based upon the number of wagering units held by the participant at the point in time, the number of wagering units held by each other participant in the tournament at the point in time and a payout table for the tournament. Based upon the expected value, a tournament participant withdrawing from the tournament is provided with value proportional to the calculated expected value of the participant's position at the point in time the participant elects to withdraw.

In one aspect, the method further includes calculating a probability for each participant that the participant will complete the tournament in a given place relative to the other participants in the tournament. In this regard, a machine based tournament simulation may be used to calculate the probabilities for each participant completing the tournament in a place relative to other participants. The machine-based simulation may be a Monte Carlo simulation wherein multiple simulated games are played to eliminate players.

In another aspect, the game tournament is conducted via a network wherein the participants are linked to a central processing unit including a game engine that generates game results for the participants. The central processing unit may transmit a signal to the participants indicating the expected value of each participant's position in the tournament. The expected value of the participant's position may be displayed continuously or on demand to the participant. In one variation, real-time player information including the expected value for each player's position and the number of wagering units of each of the participants of in the tournament at the point in time may be displayed to a viewing audience.

In another embodiment, a method of receiving value from a prospective participant entering into a game tournament wherein a plurality of participants play a casino-style game is presented. The entry of the prospective participant is contingent upon the participant paying a buy-in fee which is based upon a calculated expected value of the participant's position at the time the participant elects to join the tournament. An expected value for the position of each participant in the tournament is calculated, including the prospective participant with the expected value based upon the number of wagering units held by participants at the time, a buy-in fee for the prospective participant and a payout table for the tournament. A fee or value is received from the prospective participant, the value proportional to the calculated expected value of the participant's position at the time.

In another aspect, a method of providing a game participant in a casino-style game tournament value based upon an expected value of his position in the tournament includes the step of calculating an expected value of a tournament participant's position and displaying the expected value to the tournament participant. If withdrawal from the tournament involves a penalty, the method may further include calculating a penalty for withdrawal prior to the end of the tournament, reducing the expected value of the tournament participant's position by the amount of the penalty to determine an adjusted value of the tournament participant's position and displaying the adjusted value to the tournament participant. In one variation, both the expected value of the tournament participant's position and the adjusted value of the tournament participant's position may be displayed to the tournament participant.

BRIEF DESCRIPTION OF THE DRAWINGS

For a more complete understanding, reference is now made to the following description taken in conjunction with the accompanying Drawings in which:

FIG. 4 is a table further illustrating implementation of one method according to the disclosure; and FIG. 5 is a table illustrating a hypothetical implementation of a method according to the disclosure.

DETAILED DESCRIPTION

Figures 1, 2:
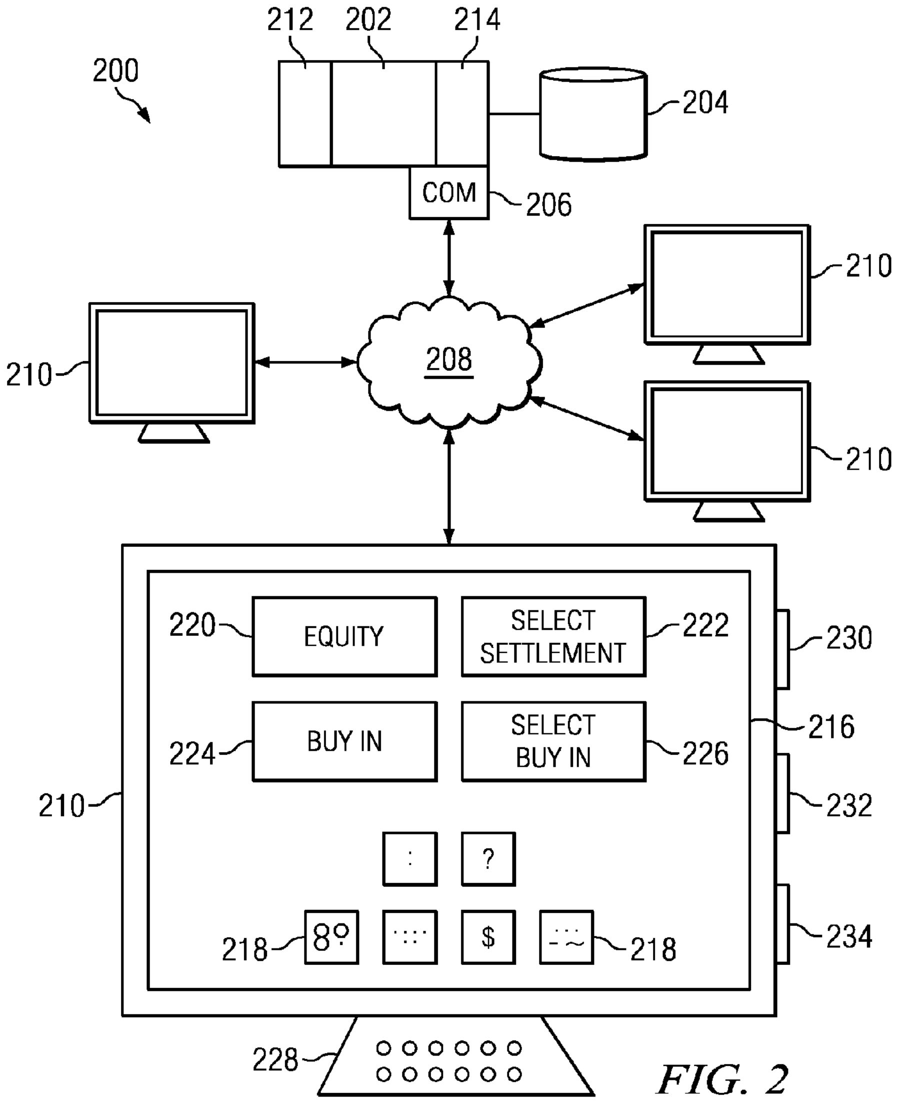
FIG. 1 illustrates an exemplary tournament pay table.
FIG. 2 is a diagrammatic representation of one system for implementing a method according to the disclosure.

Referring now to the drawings, wherein like reference numbers are used herein to designate like elements throughout, the various views and embodiments of a method and apparatus for settlement of processor based tournament competition are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

As used herein, the tournament generally refers to casino-style games wherein a plural of participants play against each other or possibly against a machine-implemented game machine. Although the method is described in connection with poker, and in particular, with "Hold'em poker" it will be appreciated that the method may be utilized in connection with other casino-style games.

In one embodiment, a settlement "equity" button or option is displayed at the completion of each hand during the tournament. When the settlement "equity" button is selected by the player, the expected value of the player's position is estimated and displayed before the next hand is dealt. The expected value of the player's position is estimated based upon his or her chip count (e.g. cash position), the number of players remaining, the distribution of chips between the remaining players, and the tournament pay table. If a participant does not activate a corresponding "settlement" button or switch within a few seconds, the next hand is dealt and the option is concurrently withdrawn. If the "settlement" button is selected by the player, the player is withdrawn from the tournament and paid the expected value of his or her chip position less a discount or penalty.

The penalty for settling may vary as the tournament progresses. For example, in the early rounds of a tournament, a 10% penalty may be assessed for settling; whereas in the final several rounds, the penalty may be reduced to 5%. In one variation, the poker website may retain an administration fee, for example 20% of the penalty and place 80% of the penalty back into the prize pool. Thus, any potential objections by the remaining players will be ameliorated by the addition to the remaining players' prize pool.

A poker website implementing the method described herein may benefit on three fronts: attracting players away from other websites, inducing players to enter when time constraints make participation otherwise prohibitive, and retention of the administrative fee. Many players will appreciate the settlement feature, as they will be able to monitor their financial progress. The feature also satisfies the inherent proclivity of humans for hedge strategies.

One objective of the method is to provide a unique, fair, accurate and equitable method for informing competitors on an ongoing basis of their current, or near current financial standing in competitive tournaments in general. The purpose may be for general interest, or it may be to determine an actual "cash-out" settlement value. The method employs a pay table for prize distribution, or a similar method for determining the amounts of all the prizes which will be awarded at the end of the tournament. the calculated expected value for the position of each participant in the tournament is based upon one or more tournament pay out schedules or pay tables, including, but not limited to a winner take all payout.

One application of the method may be to inform a viewing audience what each player's equity is at any given time, and from time to time, what equity swings will result from the player's decision to call or fold. Still another application might be to furnish the "World Series of Poker," or other competitions, the amounts of the remaining player's equities, e.g., the expected value of the player's chip position at the end of each daily session. This information could be provided solely as a matter of interest or it may be used as a basis for settlements in actual tournaments.

As will be appreciated, the number of calculations required to generate an estimate of the expected value of a participant's hand in real time necessitates that the estimates be calculated with a computer processor. In one embodiment, a high-speed computer is utilized, running Monte Carlo simulation(s) to estimate, in real-time, the current status, e.g., expected value of each player's position. The machine-based simulation plays out the tournament repeatedly in random fashion with sufficient iterations to achieve satisfactory confidence in the results. The variables of prize distribution, number of participants remaining, and their current respective game stakes produce consistent estimates, allowing for statistical variance.

While the method described herein may be employed in a variety of competitive environments, the method is particularly suitable for use in connection with internet gaming, and specifically, internet poker tournaments. One or more high-speed computer processors are utilized to calculate or closely estimate each participant's monetary expectation at the end of each hand and before the beginning of the next hand. This information may be automatically displayed on each player's computer monitor, or may be made available at the player's request.

The method described herein provides players on a real-time, ongoing basis a "fair-settlement-value" for their chip position which they may elect to cash-in at any time, or alternatively, at times restricted by pre-stated tournament rules. It is anticipated that a penalty or discount to the expected value of the participant's chip position will be involved, at the pre-stated discretion of the tournament rules committee. The settlement option will be available before the beginning of each new deal, and will be the player's unilateral decision subject to tournament rules.

Input parameters to conduct the Monte Carlo simulation are tournament prize pay table(s), the number of remaining players in the tournament, and their respective positions, e.g., amounts potentially at risk, or their "stack sizes", e.g., chip positions. As used herein, a participant's "position," or "chip stack" refers to the number of chips or wagering units in the possession of the participant. It will be understood that chips or wagering units are a means of determining a participant's position with respect to other participants in the tournament and have no set value. It will also be appreciated that the expected value associated with a chip or wagering unit may vary between participants at any given point in time. Further, while in one embodiment, the method initially assumes that all players are equal in skill, at some time this parameter may be altered to reflect possible advantages of more skilful players as the tournament progresses. It is conceivable that in some instances, different simulations will be made with varying assumptions.

FIG. 1 shows an exemplary seven place pay table that may be used in a tournament. Utilizing the pay table of FIG. 1, the first place finisher would receive 33% of the prize pot while the seventh place finisher would receive 6% of the prize pot. Typically the prize pot consists of the entry or "buy-in" fees paid by the participants to enter the tournament, less a percentage paid to the tournament operator. Numerous different pay tables may be utilized in tournament poker (or similar casino-style games) depending upon the particular game, the level of players, the number of players and other factors. In order to determine the probability of a player finishing in a paying position, a Monte Carlo simulation, or a calculation which reaches equivalent results, is employed, taking into consideration the number of participants remaining in the tournament at any given time and the chip distribution among the participants. Although not a necessary condition, one embodiment would involve the assumption that all players are equal in their levels of competence. In other variations a success factor could be used to weight a player's level of skill.

FIG. 2 is a schematic representation of a system suitable for use in implementing an online or networked system for enabling players to participate in a machine based poker tournament including an equity cash-in or buy-in for players during the tournament. The system includes one or more computer processors 202 with one or more associated data storage devices 204 for storing game software, statistics, player account balances, player tournament positions etc. A wired or wireless communications interface 206 enables communications between a plurality of player terminals 210 and processor 202 via a public or private network. Player terminals 210 may be dedicated gaming machines located in casinos or similar establishments or may be personal computers located in residences or other locations convenient to potential players. A game machine 214 includes hardware, firmware and software necessary to conduct the tournament. An estimate engine 212 includes hardware, firmware and software necessary to conduct simulations and estimate the probability of the participants finishing in different places (e.g., $1^{st}$, $2^{nd}$, $3^{rd}$, . . . ) in the tournament.

Player terminals 210 may include a display 216 used to display indicia representing a game state, for example, in the case of poker, the display may include visual representations of cards 218 dealt. In one embodiment display 216 is a touch screen graphical user interface that provides a participant with different options as described in greater detail below. For example, the display may include an "equity" button 220 enabling a participant to have an estimated expected value of his tournament position displayed. In different variations, the participant's expected value or "equity" may be displayed continuously on display 216. The display may also include a "select settlement" button 222 enabling the potential participant to settle or "cash out" of the tournament for the expected value of his position, less any fee or discount applied by the tournament operator.

The display may also include a "buy-in" button 224 that enables a prospective participant to have a "buy-in" fee or position displayed and a "select buy in" button 226 enabling the prospective player to buy into the tournament. If terminal 210 is not equipped with a graphical user interface, the terminal may be provided with other devices, such as a keyboard 228, switches, levers and the like to enable a participant or prospective participant to use the terminal. If terminals 210 are dedicated electronic gaming machines located in casinos or similar establishments, the terminals may include means for receiving and dispensing value such as a card reader 230, a currency reader/dispenser 232 or a ticket or token receiver/dispenser 234. Alternatively, if terminals 210 are personal computers located in residences or other locations convenient to potential players, the participants may be required to maintain an account with, or accessible to the tournament operator, that may be debited and credited to receive and dispense value.

Figure 3:
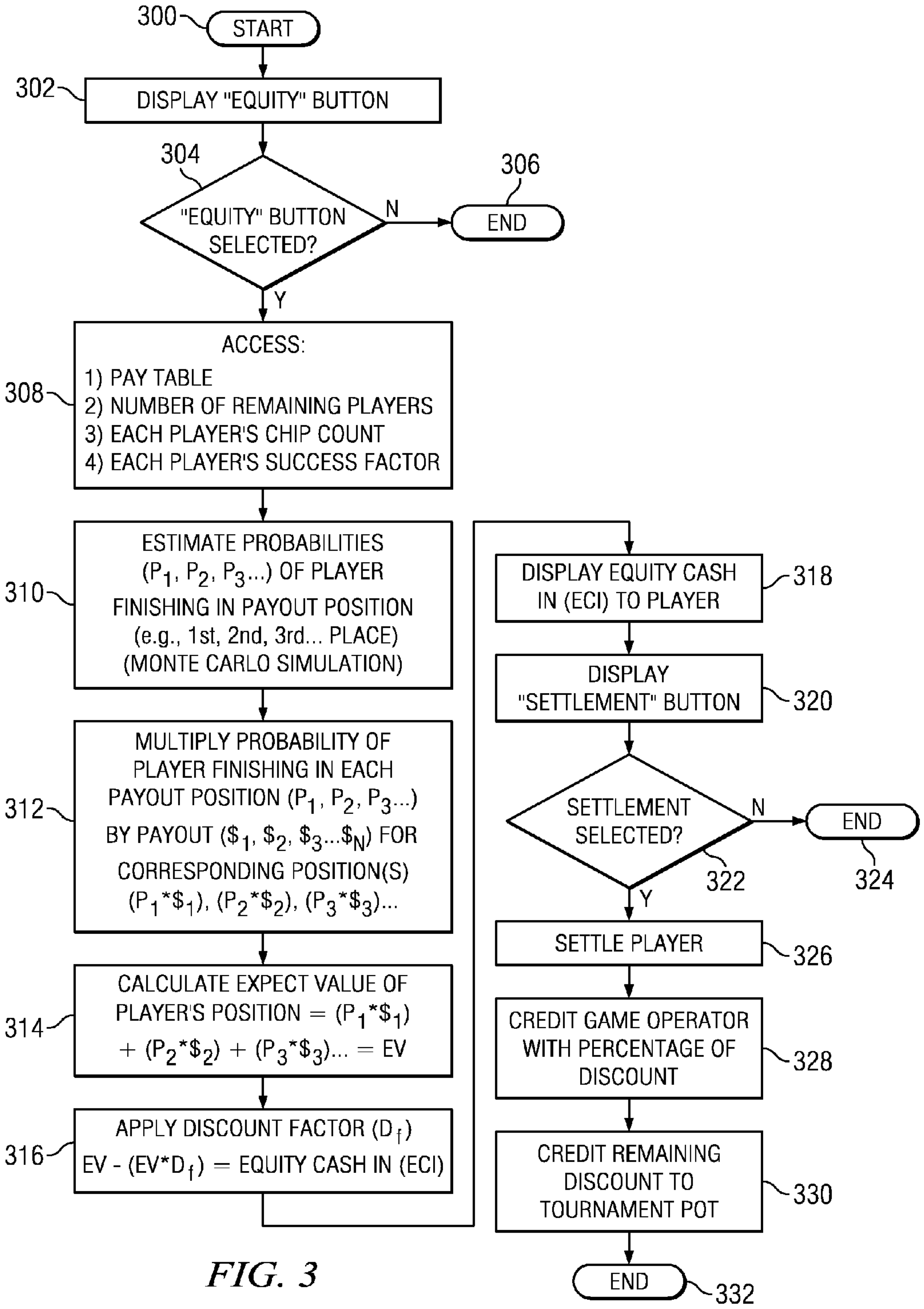
FIG. 3 is a flowchart illustrating one method according to the disclosure.

FIG. 3 is a flowchart illustrating one method of providing an equity cash-in option during an online poker tournament or in a tournament being played on a plurality of networked video game machines. The process starts at 300 with the conclusion of a poker hand during the tournament. At step 302, the participants in the tournament are presented with a display on terminals 210 (FIG. 2) giving the players the option of pressing an "equity" button. If a participant elects not to press the "equity" button at step 304, within a predetermined time period, for example, 10 or 15 seconds, the process ends with respect to that participant and the tournament will continue after the remaining participants either decline or elect to proceed as hereinafter described.

Assuming that a participant elects to push the "equity" button at step 304, processor 202 accesses or collects the following information at step 308: 1) the pay table for the tournament, 2) the number of players remaining in the tournament; 3) each player's chip count, and optionally, 4) "success factors," (e.g., a number indicative of the player's skill) for participants. The optional success factor may be based on a player's performance in the particular tournament, for example the number of and/or size of the hands the player has won in the tournament. Alternatively, the optional success factor may be based the player's performance e.g. finishing position(s), the amount the player has won or lost in previous tournaments and similar factors. As will be appreciated, the number of players remaining in the tournament, and each player's chip count will change from hand-to-hand during the tournament as may the optional player success factor.

At step 310, processor or processors 202 utilize an estimation engine 212 to estimate, for each player, that has elected the "equity" option, the probabilities ($P_1$, $P_2$, $P_3$, . . . ) that the player will place in one of the paying positions ($1^{st}$, $2^{nd}$, $3^{rd}$, . . . ). In other embodiments, the probabilities may be computed for each player so that the expected value ("equity") of each player's position may be determined and displayed to the player at the conclusion of each hand. The estimation engine 212 includes the software, firmware and hardware necessary to conduct the calculations in a timely fashion.

In one embodiment, the estimation engine 212 uses a Monte Carlo simulation to play the tournament to completion a sufficient number of times to provide an estimate to a predetermined desired level of confidence. For example, the estimates may be based upon a sequence of simulated "all-in" events between randomly drawn players. During the simulation, each player is dealt a poker hand at random and the player with the smaller chip stack wagers his entire stack on the outcome of the hand. If the player with the larger cash or chip position wins, the loser's chip stack is added to the winner's, and the loser exits the tournament with a position determined by the number of remaining players.

If the player with the lesser chip position stack side wins the hand, his stack is doubled at the expense of his opponent, as in a regular poker tournament. The tournament simulation continues until all but one of the players or participants is eliminated and estimates of the probabilities of final places of the players in question have been determined. As previously noted, the inputs to run the simulation include the pay table for the tournament, the number of players remaining in the tournament, and each player's chip count. Optionally, a player's "success factor," e.g., a number indicative of the player's skill level or previous success may be employed in the simulation. If a "player success factor" is considered, it may be used to weigh (increase or decrease) the estimated probability of a player finishing in a paying position.

In order to estimate the "equity" of a given player (the expected value of the player's position), a string of simulations is used to provide an estimated placement distribution P1, P2, . . . Pn, where Pi is the probability of the player finishing in place i. The tournament simulation is repeated a sufficient number of times and the results averaged to obtain an estimated placement distribution with the desired level of confidence. For example, the tournament simulation may be repeated 50, 100, 1000 or a greater number of times.

For those players electing the "equity" option, for each such player, the probability (P1, P2, P3, . . . Pn) of that player finishing in one of the paying positions n is multiplied by the payout ($1, $2, $3, . . . $n) of that position to calculate the player's "equity" or expected value of the player's position as P1*$1+P2*$2+ . . . +Pn*$n. For the purpose of illustration, a "Hold'em" poker tournament may have seven remaining players with the tournament rules providing for payouts to the top seven finishing positions in the tournament with an exemplary payout table as illustrated in FIG. 1. Referring to the payout table, for example, if the total prize pot is $100,000, the payout ratio from FIG. 1 for first place is 33%. If the estimated probability of a player finishing in first place is 10%, the result is $100,000*0.33*0.10=$3300.00. This calculation is repeated for each paying position and the results are summed for that player at step 314 to determine an expected value (EV) for the player's position: $EV=((P_1*\$_1)+(P_2*\$_2)+(P_3*\$_3))$.

FIG. 4 is a table illustrating these calculations for a player selecting the "equity" option. As shown, the expected value (EV) of the player's position is $11,730.00. In one embodiment, after the expected value (EV) of the player's position is determined, a discount factor ($D_f$) or penalty is applied to the expected value at step 316. For example, the penalty may be 5%, 10% or 15% depending upon the number of players remaining and the particular rules implemented by the tournament operator. For example, if the discount factor is 10%, an equity cash-in value (ECI) may be calculated as ECI=EV−(EV*0.10). Using the example of FIG. 4, the ECI would be calculated as $11,730−($11,730*0.10)=$10,557. The ECI is displayed to the player at step 318 along with a "settlement" button (step 320) which gives the player the option of withdrawing from the tournament and cashing in his or her position for the equity cash-in value (ECI).

If the player does not select the ECI cash-in option at step 322, the process ends at step 324 and the tournament will continue after the remaining tournament participants either decline or elect to proceed with the settlement option. If the player selects the ECI cash-in option, the player is settled or cashed-in at step 326. In the example illustrated in FIG. 4, the player's account would be credited with $10,557.00 and the game operator is credited with a percentage of the penalty or discount at step 328. In one embodiment, the game operator may be credited with 10% of the discount. In the example of FIG. 4, the discount is $1173.00; therefore, the game operator would receive $117.30. The remaining portion of the discount ($1055.70) would be credited to the tournament prize pot at step 330. After all participants have elected or declined the settlement option, the process ends at step 332 and tournament play resumes.

Neglecting any penalty or discount received by the game operator, the foregoing method allows a player to receive a settlement based upon the expected value of his or her position in a tournament at a given point in time. The method may be utilized to allow a player to settle or cash-out without affecting the expected value or "equity" of the positions held by the remaining players in tournament. In the case where a portion of a penalty or discount is applied or credited to the tournament prize pot, the equity of the remaining players may be increased.

Turning to FIG. 5, by way of further illustration, nine participants remain in a hypothetical poker tournament. The position, e.g. number of wagering units, of each of the remaining participants is presented, along with the percentage of the wagering units held by each of the nine remaining participants. In this example, the total number of "chips" or wagering units is assumed to be 219,625 and the prize pot is assumed to be approximately $29,033.00 with the payout table (prizes) for the remaining participants presented. As illustrated, the expected value of the leading participant is approximately $5514.00 while the expected value of the trailing participant is approximately $1971.00.

A chip index is also calculated as the percentage of chips or wagering units held by each player divided by the percentage of the prize pots represented by the expected value of the participant's position. The index provides an indication of the relative expected value of each wagering unit held by a participant. Notably, the relative value of wagering units or chips held by a participant increases as the number of wagering units held by a participant decreases.

In another embodiment, a similar methodology may be used to determine a buy-in position for a player or prospective participant desiring to enter an ongoing tournament. For example, if there are 10 players remaining in a tournament having a total prize pot of $100,000, a new player or participant wishing to enter the tournament may be required to "buy into" the tournament for a fee of $10,000.00. Although the buy-in fee or amount may be varied, it is anticipated that in most instances, the tournament rules will set a fixed a buy-in amount. It is also anticipated that the tournament rules will provide for an additional fee to be paid to the tournament operator or that the buy-in amount will be discounted to provide such a fee to the operator. For example, the tournament operator may charge a 5% or 10% fee for allowing a prospective participant to enter the tournament. The fee may be varied depending upon the amount of time remaining in the tournament or the number of participants remaining in the tournament at the time of the buy in.

The expected value or equity of the new player's position may then be estimated on the basis of a new prize pot of $110,000 with 11 players and the game payout table as previously described. The size of the chip stack or number of wagering units received by the new player will then be determined on the basis of the expected value of his or her position at the time of the new player's buy-in. The new participant's "buy in" does not impact the expected value of the position of the other participants in the tournament insofar as new participant's position is determined based upon a larger prize pot to be divided by the participants.

The foregoing method enables a tournament to continue indefinitely, subject to the rules of the tournament. Participants in a tournament may elect to "cash out" based on the expected value of their position relative to the other participants. Alternatively, prospective new participants may elect to "buy into" the tournament based upon the expected value of their position relative to the other participants. The foregoing method may be applied in tournaments wherein the tournament rules provide for multiple winners or where the rules provide for one winner or a "winner take all" payout.

It will be appreciated by those skilled in the art having the benefit of this disclosure that this method and apparatus for settlement and entry of a processor based tournament competition provides an equitable method for enabling a player in a processor based gaming tournament to leave the tournament while still receiving a fair value for his position in the tournament considering his cash position, the number of players in the tournament at the time and a predetermined payout table or scheme. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of providing a participant value in a game tournament wherein a plurality of participants play a casino-style game using player terminals linked via an electronic network to a central processing unit, the value provided to the participant based upon the participant's equity at the time the participant elects to withdraw from the tournament after the beginning of the tournament, the method comprising:

estimating an equity for the participant in the tournament with the central processing unit, the central processing unit determining the equity based upon the number of wagering units held by the participant at the point in time, the number of wagering units held by each other participant in the tournament at the point in time and a payout table for the tournament the central processing unit estimating an equity for each participant with a machine-based monte carlo simulation, simulating multiple games wherein a series of games are played to completion with participants being eliminated during the course of the simulation wherein simulated games are repeated the number of times necessary to estimate an equity with a predetermined confidence level; and providing a tournament participant withdrawing from the tournament with value proportional to the participant's equity at the point in time without decreasing the remaining tournament participants' equity in the tournament.

2. The method of claim 1 further comprising estimating, with the central processing unit, a probability for each participant that the participant will complete the tournament in a given place relative to the other participants in the tournament.

3. The method of claim 1 wherein the casino-style game is poker.

4. The method of claim 1 wherein the game tournament is conducted via a network wherein the participants are linked to a central processing unit including a game engine, the game engine generating game results for the participants.

5. The method of claim 4 wherein the central processing unit transmits a signal to the participant's player terminals indicating the equity of each participant in the tournament.

6. The method of claim 1 further comprising displaying to a tournament participant withdrawing from the tournament a penalty for withdrawal prior to the end of the tournament and reducing the value of the participant's equity at the point in time by the penalty amount and wherein the penalty is displayed to the participant with a player terminal.

7. The method of claim 1 further comprising providing a potential participant the option to participate in the tournament for value proportional to the equity of the potential participant's position at the time the potential participant elects to enter the tournament.

8. The method of claim 7 wherein the value provided by the potential participant varies with the duration of the tournament.

9. The method of claim 1 wherein the relative value of each of the tournament participant's wagering units is inversely proportional to the number of wagering units held by the participant.

10. A method of receiving value from a prospective participant in a game tournament wherein a plurality of participants play a casino-style game using player terminals linked via an electronic network to a central processing unit, the prospective participant's equity at the time the participant elects to join the tournament after the beginning of the tournament determined by a method comprising:

estimating an equity for the position of each participant in the tournament, including the prospective participant with the central processing unit, the central processing unit determining the prospective participant's equity based upon the number of wagering units held by participants at the time, a buy-in fee for the prospective participant and a payout table for the tournament the central processing unit estimating a an equity for each participant, including the prospective participant, with a machine-based monte carlo simulation, simulating multiple games with the central processing unit wherein a series of games are played to completion with participants being eliminated during the course of the simulation;

receiving from the prospective participant, value proportional to the participant's equity at the time; and providing the prospective participant with a number of wagering units corresponding to the participants estimated equity without affecting the remaining tournament participants' equity in the tournament.

11. The method of claim 10 further comprising estimating a probability with the central processing unit for each participant that the participant will complete the tournament in a given place relative to the other participants in the tournament.

12. The method of claim 10 wherein the casino-style game is poker.

13. The method of claim 10 wherein the game tournament is conducted via a network wherein the participants are linked to a central processing unit including a game engine, the game engine generating game results for the participants.

14. The method of claim 10 wherein the central processing unit transmits a signal to the participant's player terminals indicating each participant's equity in the tournament.

15. The method of claim 10 wherein estimating an equity for the position of each participant in the tournament is based upon one or more tournament pay out schedules including a winner take all payout.

16. The method of claim 10 wherein the relative value of each of the tournament participant's wagering units is inversely proportional to the number of wagering units held by the tournament participant.

17. A method of providing a game participant in a casino-style game tournament wherein participants participate in the tournament using player terminals linked via an electronic network to a central processing unit, value based upon the participant's equity in the tournament, the method comprising:

determining the number of participants in the tournament at a point in time before the end of the tournament;

determining the number of wagering units of each of the participants;

accessing, with a central processing unit, a pay-out table for the tournament, the payout table providing a pay-out ratio wherein a predetermined number of winners of the tournament receive a portion of a prize pot based upon their wagering unit position at the end of the tournament;

calculating, with the central processing unit, each participant's equity at the point in time based upon the number of participants in the tournament at the point in time, the number of wagering units of each of the participants of in the tournament at the point in time and the payout table, the central processing unit estimating an equity for each participant, including the prospective participant, with a machine-based monte carlo simulation, simulating multiple games with the central processing unit wherein a series of games are played to completion with participants being eliminated during the course of the simulation and wherein the simulation is repeated the number of times necessary to estimate an equity with a predetermined confidence;

determining, with the central processing unit, a penalty for withdrawal prior to the end of the tournament;

reducing the tournament participant's equity by the amount of the penalty to determine an adjusted value of the tournament participant's equity;

displaying, with the participant's player terminal, the adjusted equity to the tournament participant; and providing a tournament participant withdrawing from the tournament with value based upon the calculated participant's equity at the point in time corresponding to the participant's adjusted equity without decreasing the remaining tournament participants' equity in the tournament.

18. The method of claim 17 further comprising calculating, with the central processing unit, a probability for each participant that the participant will complete the tournament in a given place relative to the other participants in the tournament.

19. The method of claim 17 further comprising providing real-time player information including each player's equity and the number of wagering units of each of the participants of in the tournament at the point in time to a viewing audience.

20. The method of claim 17 further comprising displaying, with the participant's player terminal, both the tournament participant's equity and the adjusted tournament participant's equity to the tournament participant.

21. The method of claim 17 wherein the award for the tournament is a winner-take-all payout.

22. A method of providing a game participant in a poker tournament wherein participants participate in the tournament using player terminals linked via an electronic network to a central processing unit, value based upon the participant's equity in the tournament, the method comprising:

determining the number of participants in the tournament at a point in time before the end of the tournament;

determining the number of wagering units of each of the participants;

accessing, with a central processing unit, a pay-out table for the tournament, the payout table providing a pay-out ratio wherein a predetermined number of winners of the tournament receive a portion of a prize pot based upon their wagering unit position at the end of the tournament;

estimating, with the central processing unit, each participant's equity at the point in time based upon the number of participants in the tournament at the point in time, the number of wagering units of each of the participants of in the tournament at the point in time and the payout table the central processing unit estimating an equity for each participant with a machine-based simulation, wherein a series of events between a pair of randomly drawn players are simulated and wherein each randomly drawn player is dealt a poker hand at random and the player with the lesser number of wagering units wagers all of his wagering unit on the outcome of the hand wherein:

(i) if the randomly drawn player with the greater number of wagering units wins, the losing, randomly drawn player's wagering units are added to the winning, randomly drawn player's wagering units and the losing player is eliminated; and (ii) if the randomly drawn player with the lesser number of wagering units wins, the losing randomly drawn player's wagering units are doubled with a corresponding reduction in the number of wagering units held by the randomly drawn player with the greater number of wagering units;

wherein the simulation is repeated the number of times necessary to estimate an equity with a predetermined confidence level; and providing a tournament participant withdrawing from the tournament with value based upon the calculated participant's equity at the point in time without decreasing the remaining tournament participants' equity in the tournament.

* * * * *